United States Patent
Arnaud et al.

(10) Patent No.: US 8,369,578 B2
(45) Date of Patent: Feb. 5, 2013

(54) METHOD AND SYSTEM FOR POSITION DETERMINATION USING IMAGE DEFORMATION

(75) Inventors: Charles Arnaud, Villeneuve Loubet (FR); Philippe Gregoire, Le Gaude (FR); Dominique Picard, La Gaude (FR); Alexandre Van Gent, La Gaude (FR)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/405,058

(22) Filed: Feb. 24, 2012

(65) Prior Publication Data

US 2012/0155713 A1 Jun. 21, 2012

Related U.S. Application Data

(63) Continuation of application No. 12/323,245, filed on Nov. 25, 2008, now Pat. No. 8,155,387.

(30) Foreign Application Priority Data

Oct. 13, 2008 (EP) .................................... 08305673

(51) Int. Cl.
G06K 9/00 (2006.01)
H04N 5/14 (2006.01)
(52) U.S. Cl. .................. 382/106; 382/291; 348/700
(58) Field of Classification Search .................. 382/100, 382/103, 106–107, 155, 162, 168, 173, 181, 382/190, 232, 254, 274, 276, 282, 286–291, 382/305, 312, 294; 348/699, 700, 701
See application file for complete search history.

(56) References Cited

U.S. PATENT DOCUMENTS

| | | | |
|---|---|---|---|
| 5,414,474 A * | 5/1995 | Kamada et al. | 348/700 |
| 6,226,418 B1 * | 5/2001 | Miller et al. | 382/294 |
| 6,493,458 B2 | 12/2002 | Yasui et al. | |
| 7,613,361 B2 * | 11/2009 | Anabuki et al. | 382/287 |
| 7,657,065 B2 * | 2/2010 | Kotake et al. | 382/106 |
| 7,991,194 B2 * | 8/2011 | Kim et al. | 382/103 |
| 2002/0031242 A1 * | 3/2002 | Yasui et al. | 382/104 |

OTHER PUBLICATIONS

Chakravarty, P., "Vision-based Indoor Localization of a Motorized Wheelchair," Dept. of Electrical and Computer Systems Engineering, Technical Report MECSE-25-2005, Jan.-Mar. 2005, Monash University, downloaded at http://www.ds.eng.monash.edu.au/tech rep/reports/2OO5/M ECSE-25-2005.pdf.*

Spiller, J.M., et al., "Medical Image Segmentation and Localization Using Deformable Templates," World Congress on Medical Physics and Biomedical Engineering 2006, Aug. 27-Sep. 1, 2006, pp. 2292-2295, COEX Seoul, Korea "Imaging the Future Medicine", downloaded at http://arxiv.org/ftp/arxiv/papers/0705/0705.0781.pdf.

(Continued)

*Primary Examiner* — Seyed Azarian
(74) *Attorney, Agent, or Firm* — Kenneth L. Sherman, Esq.; Michael Zarrabian, Esq.; Sherman & Zarrabian LLP

(57) ABSTRACT

A method and system of position determination using image deformation is provided. One implementation involves storing an actual tag in a reference data module, receiving an image of a visual tag, the image captured by an image capturing device, comparing properties of the visual tag with properties of the actual tag; and based the comparison, determining a position of the image capturing device relative to the visual tag.

18 Claims, 10 Drawing Sheets

OTHER PUBLICATIONS

Chakravarty, P., "Vision-based Indoor Localization of a Motorized Wheelchair," Dept. of Electrical and Computer Systems Engineering, Technical Report MECSE-25-2005, Jan.-Mar. 2005, pp. 1-17, Monash University, Melbourne, Australia, downloaded at http://www.ds.eng.monash.edu.au/techrep/reports/2005/MECSE-25/2005.pdf.

U.S. Notice of Allowance for U.S. Appl. No. 12/323,245 mailed Nov. 29, 2011.

* cited by examiner

METHOD AND SYSTEM FOR POSITION DETERMINATION USING IMAGE DEFORMATION

CROSS-REFERENCE TO RELATED APPLICATIONS

This patent application is a continuation patent application of U.S. patent application Ser. No. 12/323,245, filed on Nov. 25, 2008, which application claims priority of EP08305673 filed on Oct. 13, 2008, the disclosures of which are incorporated herein in their entirety by reference.

BACKGROUND

1. Field of the Invention

The invention relates generally to position determination and, more particularly, to position determination using images.

2. Background Information

Industrial processes have an increasing need for localizing people or assets in order to optimize their processes. Conventionally, outdoor positioning systems, such as global positioning systems (GPS), are used to detect position information and navigate to a desired location. Indoor localization often leverages complex "GPS-like" technologies such as WIFI or UltraWide Band that require complex infrastructure and sophisticated devices or tags.

BRIEF SUMMARY

The invention provides a method and system for position determination using image deformation. One embodiment involves storing an actual tag in a reference data module, receiving an image of a visual tag, the image captured by an image capturing device, comparing properties of the visual tag with properties of the actual tag; and based the comparison, determining a position of the image capturing device relative to the visual tag.

Other aspects and advantages of the invention will become apparent from the following detailed description, which, when taken in conjunction with the drawings, illustrate, by way of example, the principles of the invention.

BRIEF DESCRIPTION OF THE SEVERAL VIEWS OF THE DRAWINGS

For a fuller understanding of the nature and advantages of the invention, as well as a preferred mode of use, reference should be made to the following detailed description read in conjunction with the accompanying drawings, in which.

DETAILED DESCRIPTION

Figure 1B:
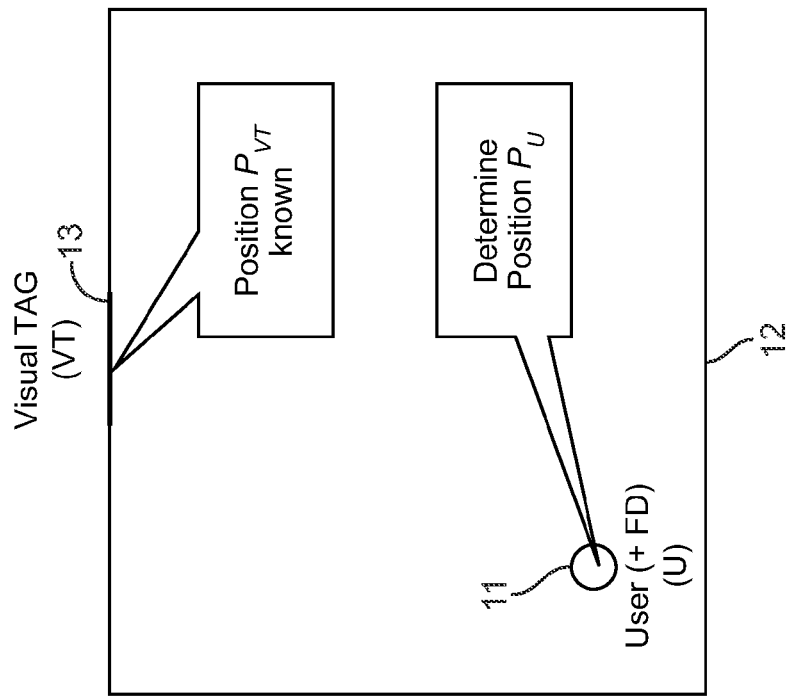
FIGS. 1A-B show examples of positioning visual tags relative to a user for determining position of the user using visual tag image deformation, according to an embodiment of the invention.

The following description is made for the purpose of illustrating the general principles of the invention and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc.

The invention provides a method and system for position localization using image (picture) deformation. One embodiment includes determining position of an object (e.g., a user, asset), especially in an indoor environment. A tag with a known identification and position is provided relative to an object whose position is to be detected. The tag has a known position and orientation (e.g., x, y, z, azimuth) in an indoor environment. The tag also has known physical and geometrical characteristics (e.g., square, rectangle, other shapes regular or otherwise, in color or black/white).

An image of the tag is obtained using an image capturing device (e.g., an image from a still camera, a video camera). The image includes said identification of the tag (numeric or other ID) which may be interpreted by a detection module (e.g., software program). The identification in the image is used to link the tag image with the tag characteristics, position, etc.

Using deformation information of the tag in the image, and position information of the tag, the position of the object (e.g., image capturing device) relative to the tag, and hence absolute position of the object, is obtained. In one implementation, the approximate position of the object is determined by correlating a known position of the tag within the environment (e.g., within a structure such as a building) and relative to the object.

Additional precision may be achieved by analyzing deformation of the tag in the image by calculating the position of the camera relative to the tag. This can be achieved by analyzing the image for deformation of known geometrical characteristics of the tag due to perspective (e.g., viewing angle, geometries dimensions, and sizes) and optical characteristics of the camera at the time of capturing the tag picture (e.g., focal length of lens, size of sensor). Having calculated the relative position of the camera to the tag, and knowing the exact position and orientation of the tag, allows determining the position of the object.

In one example, this allows defining the precise position of a mobile object, equipped with a photographic device (e.g., mobile phone camera), that is capturing an image of a fixed tag, wherein the tag has an ID linked to a known position and orientation for the tag. In another example, the position of a mobile device equipped with a tag can be determined by obtaining an image of the device with the tag thereon, and determining position of the mobile device using deformation information of the tag in the image and a known position and orientation of the tag.

Figure 1A:
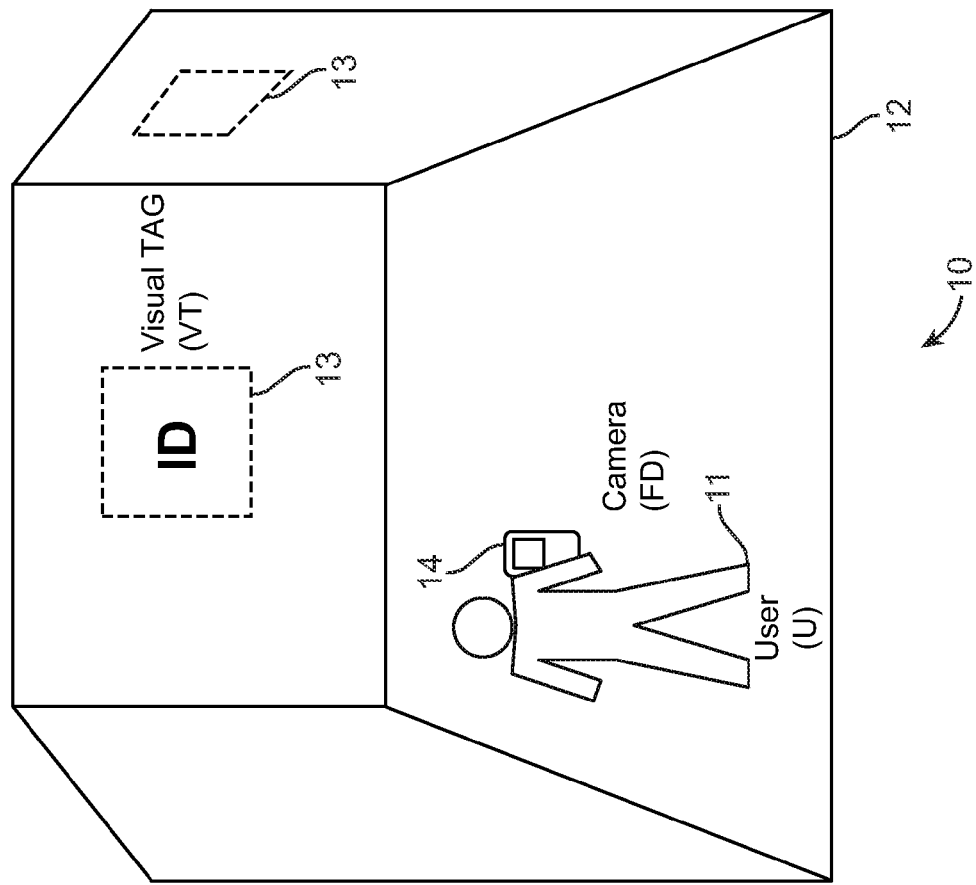
Figure 2:
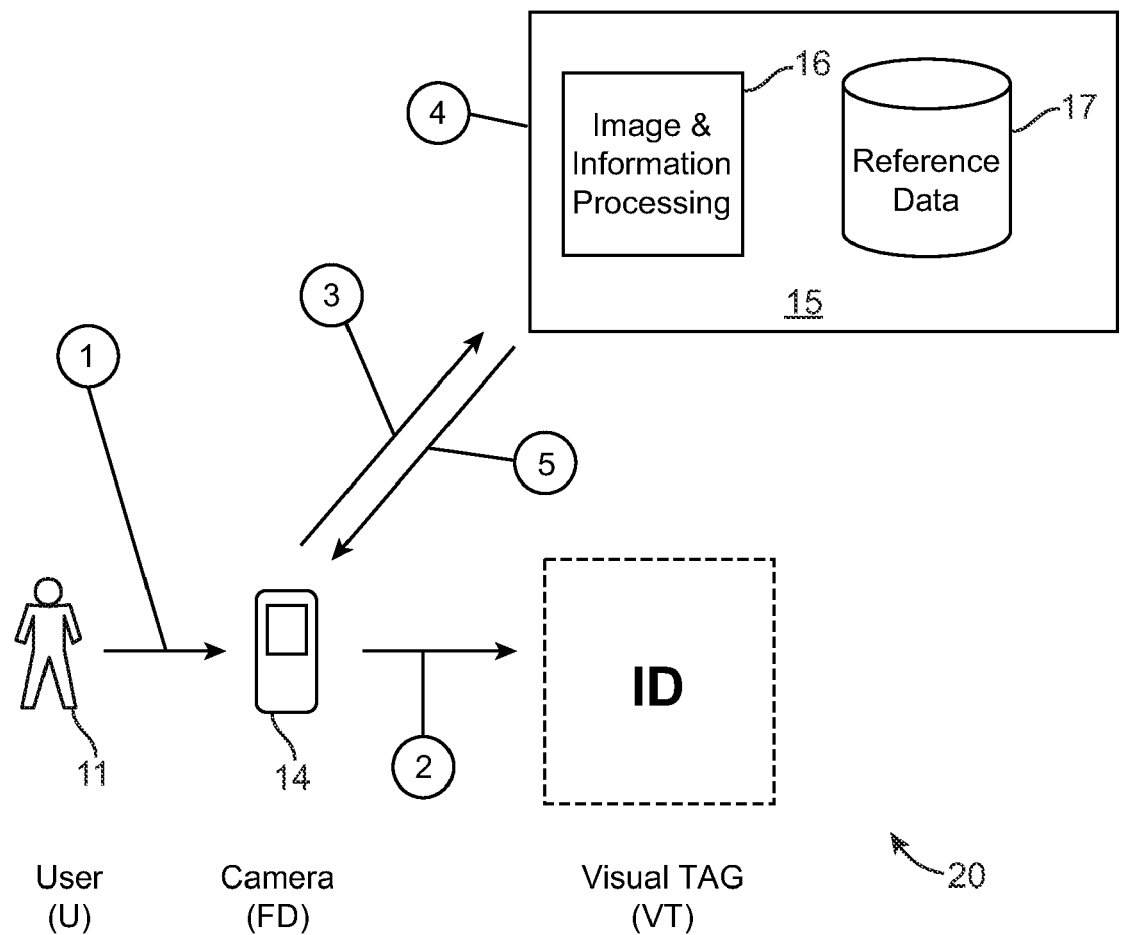
FIG. 2 shows an example process for position determination using visual tag image deformation, according to an embodiment of the invention.

Referring to FIG. 1A, one example scenario 10 involves determining the position of a user 11 within an area 12, wherein one or more tags 13 having tag identifiers, are arranged such that each tag 13 is located at a predefined position $P_{VT}$ (FIG. 1B) within said area 12. Each tag has a predefined size and geometry, wherein a user device comprising a camera unit 14 captures an image, including the tag in response to a command. A position detection module 15 (FIG. 2) then applies image processing to the image to extract an image envelope and the tag ID therefrom. FIG. 2 shows general steps of a positioning process 20, including:

Step 1: User 11 points his mobile device including camera 14 to a tag 13 (i.e., Visual Tag (VT)).

Step 2: User 11 captures an image 19 including Visual Tag 13.

Step 3: The image 19 is transmitted to the detection module 15.

Step 4: The detection module 15 determines the geographical position ($P_U$) of the camera 14, and therefore the user.

Step 5: The user position may be used by one or more applications.

Figure 3:
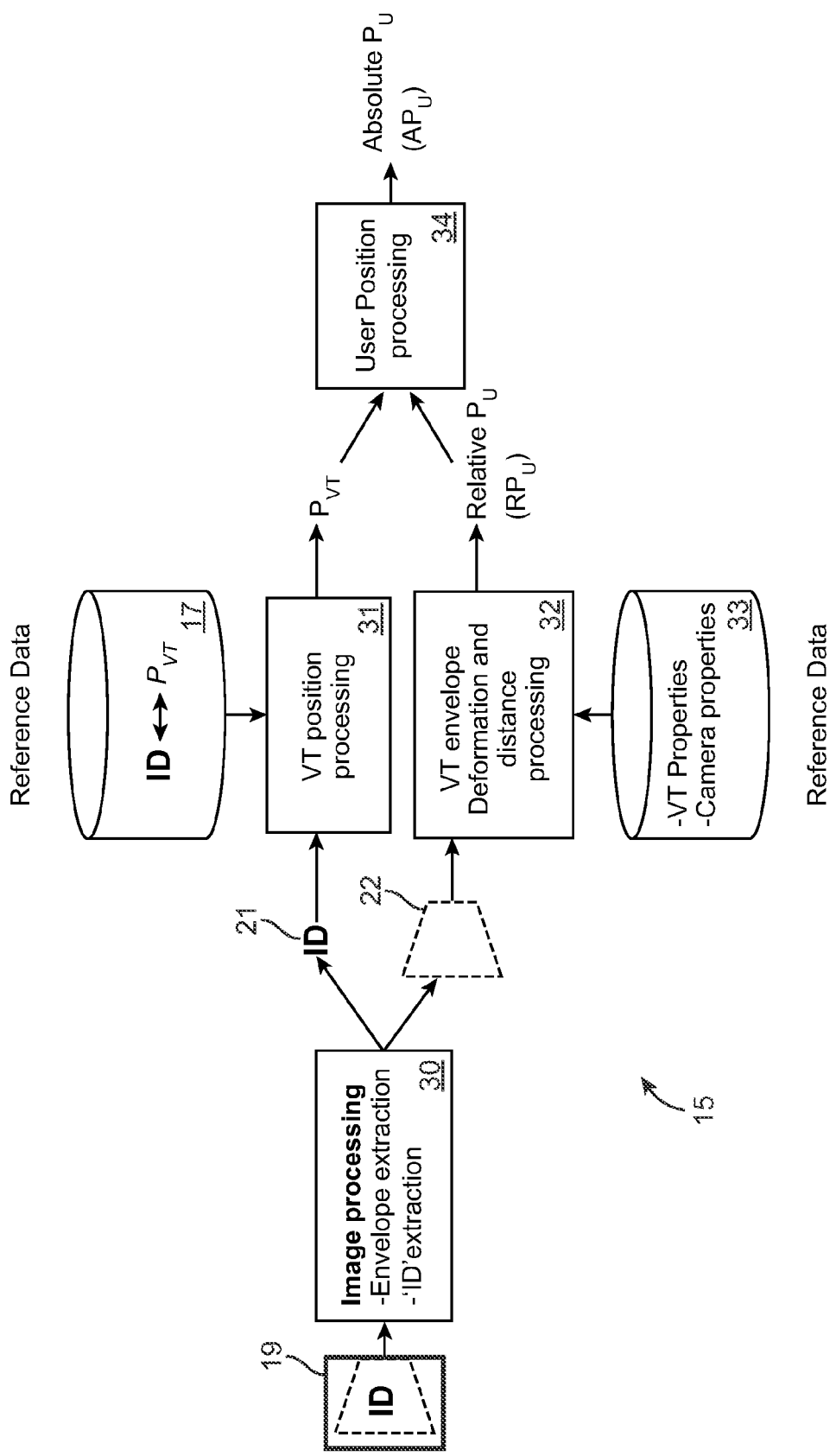
FIG. 3 shows a functional block diagram of a system for position determination using visual tag image deformation, according to an embodiment of the invention.

The detection module 15 includes a processing module 16 which uses the image of the tag, in conjunction with known information about the tag from a reference data repository 17, to determine the position of the user in the area. FIG. 3 shows a more detailed functional block diagram of the detection module 15, including an image processing module 30, a reference data module 17, a VT position processing module 31, an image envelope deformation processing module 32, a properties module 33, and a user position processing module 34.

The image processing module 30 receives an image 19 (e.g., digital image) captured by the camera 14, wherein the image includes the tag and ID of the tag. The image processing module 30 selects an envelope (area) in the image where the tag and ID appears and extracts the visual tag (VT) ID 21 and tag image 22 therefrom. The VT position processing module 31 accesses the reference data module 17 using the ID 21 to retrieve a predefined position $P_{VT}$ of the tag in the area 12 (FIGS. 1A-B).

Figure 4:
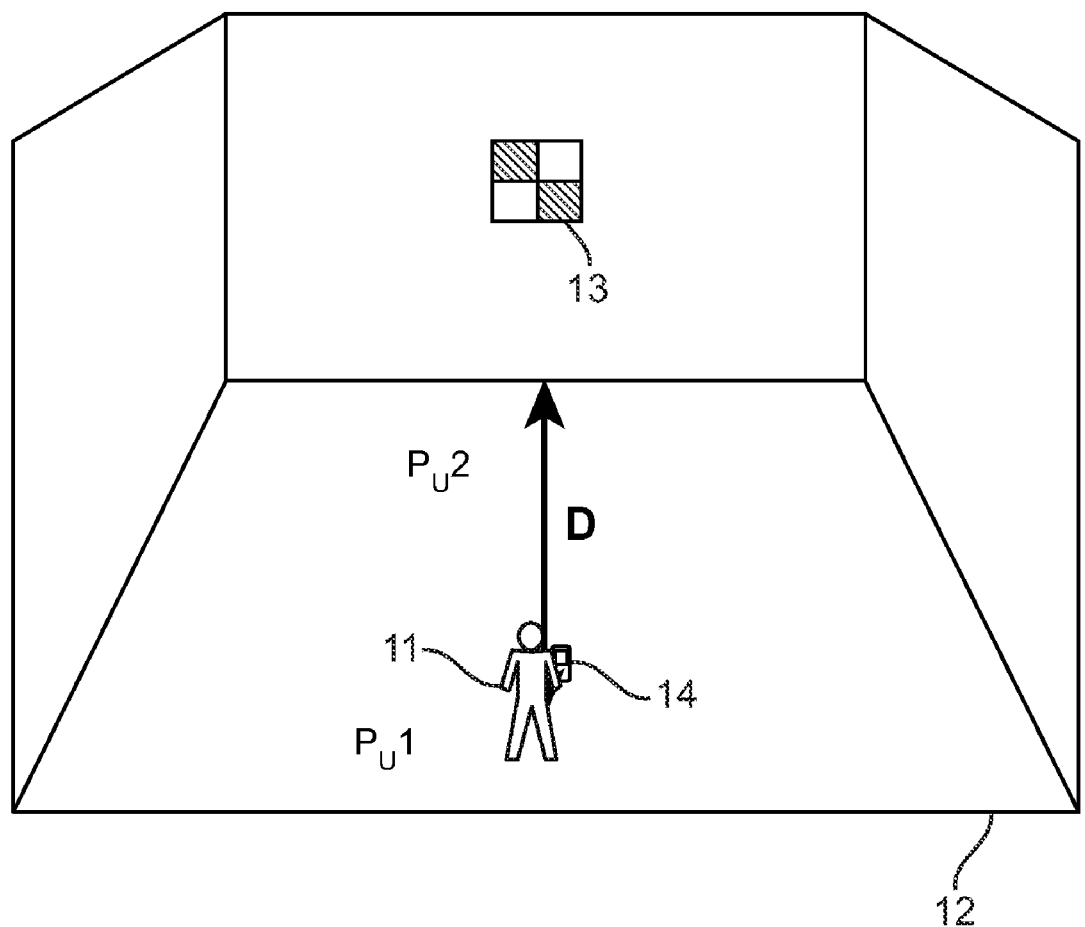
FIGS. 4-7 show example positions of image capturing devices relative to visual tags for position determination using visual tag image deformation, according to an embodiment of the invention.

The envelope deformation and distance processing module 32 processes the tag image 22, comparing the properties of the tag image with properties of the actual tag previously stored in a reference data module 33. The image envelope deformation processing module 32 uses the comparison results, along with camera properties from the reference data module 33, to determine a position $P_U$ of the user relative to the tag. The position $P_U$ is determined based on a distance D (FIG. 4) between the user 11 and the tag 13, and the angular position of the camera 14 (held by the user) with respect to the tag 13 (FIG. 2).

The angular position affects deformation of the tag image. The user position processing module 34 then computes the absolute position $AP_U$ of the user in the area 12 based on the position $P_U$ (or $RP_U$) of the user relative to the tag and the absolute position $P_{VT}$ of the tag.

In one example, the distance D is determined by the module 32 based on: the actual size S of the image 19 and the size s of the extracted image envelope 22 (determined by the distance processing module 32), the focal length parameter $f_d$ of the camera. In one example, the distance D can be determined as:

$$D = f(S, s, f_d),$$

wherein $f_d$ is the focal length of the camera (e.g., in centimeters), s is the size of the tag image 22 in the image (e.g., in pixels, centimeters), S the actual size of the image 19 (e.g., in pixels, centimeters), f( ) is a simple optical function based on basic optics law.

For example, if F is the focal length of the camera lens, $D_I$ the distance between the lens and the Image (Object distance), and $D_O$ the distance between the Object and the Image (Image distance), then:

The distances follow the formula: $1/D_I + 1/D_O = 1/F$.

For Object, very distant (infinite) formula becomes $1/D_I = 1/F$ that is $D_I = F$.

In current example, the formula is: $1/s + 1/S = 1/f_d$.

Figure 5:
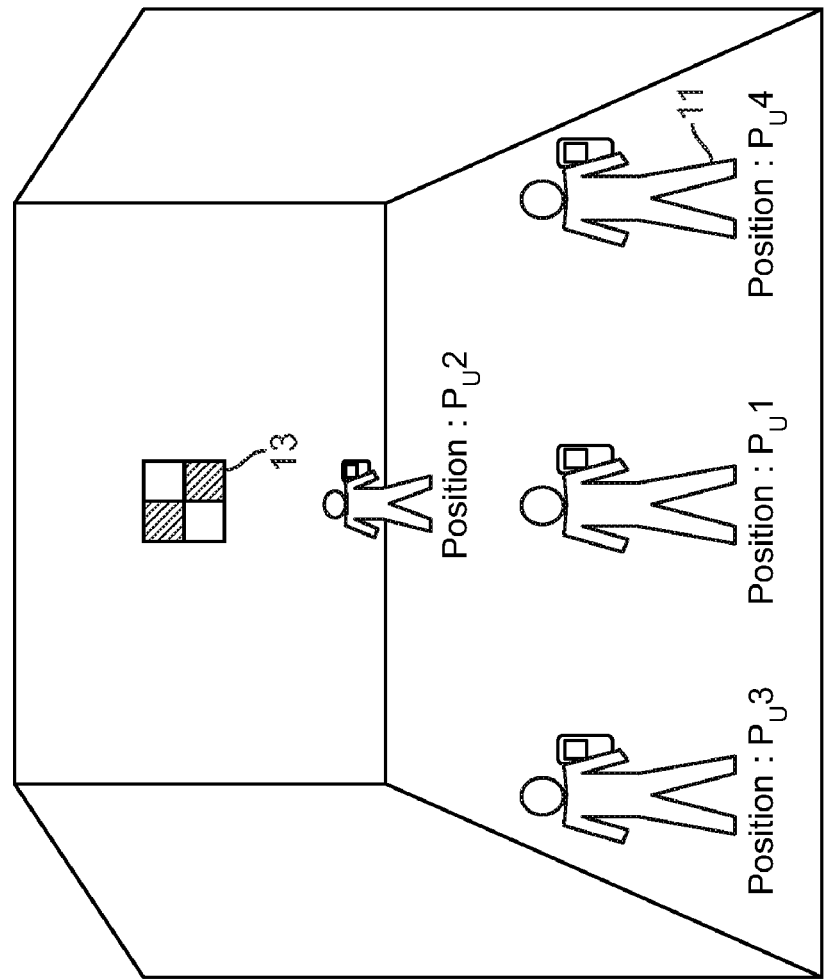
Figure 5:
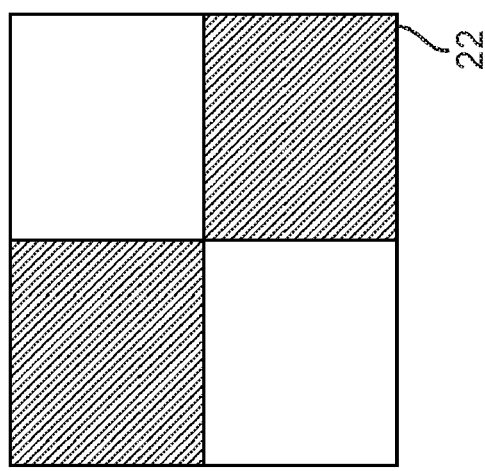

In one example, the angular position of the camera 14, relative to the tag 13, is determined by evaluating deformation of the tag in the extracted image envelope 22. FIG. 5 shows an example of various positions ($P_U 1, P_U 2, P_U 3, P_U 4$) of the user 11 relative to the tag 13 in the area 12, and also, an example of the extracted image 22 of the tag 13 from the image 19, captured from position $P_U 1$ by the camera 14, held by the user 11. The nearer the camera 14 to the tag 13 (e.g., position $P_U 2$ in FIG. 4), the larger the tag image 22. The farther the camera 14 from the tag 13 (e.g., position $P_U 1$ in FIG. 4), the smaller the tag image 22.

Figure 6:
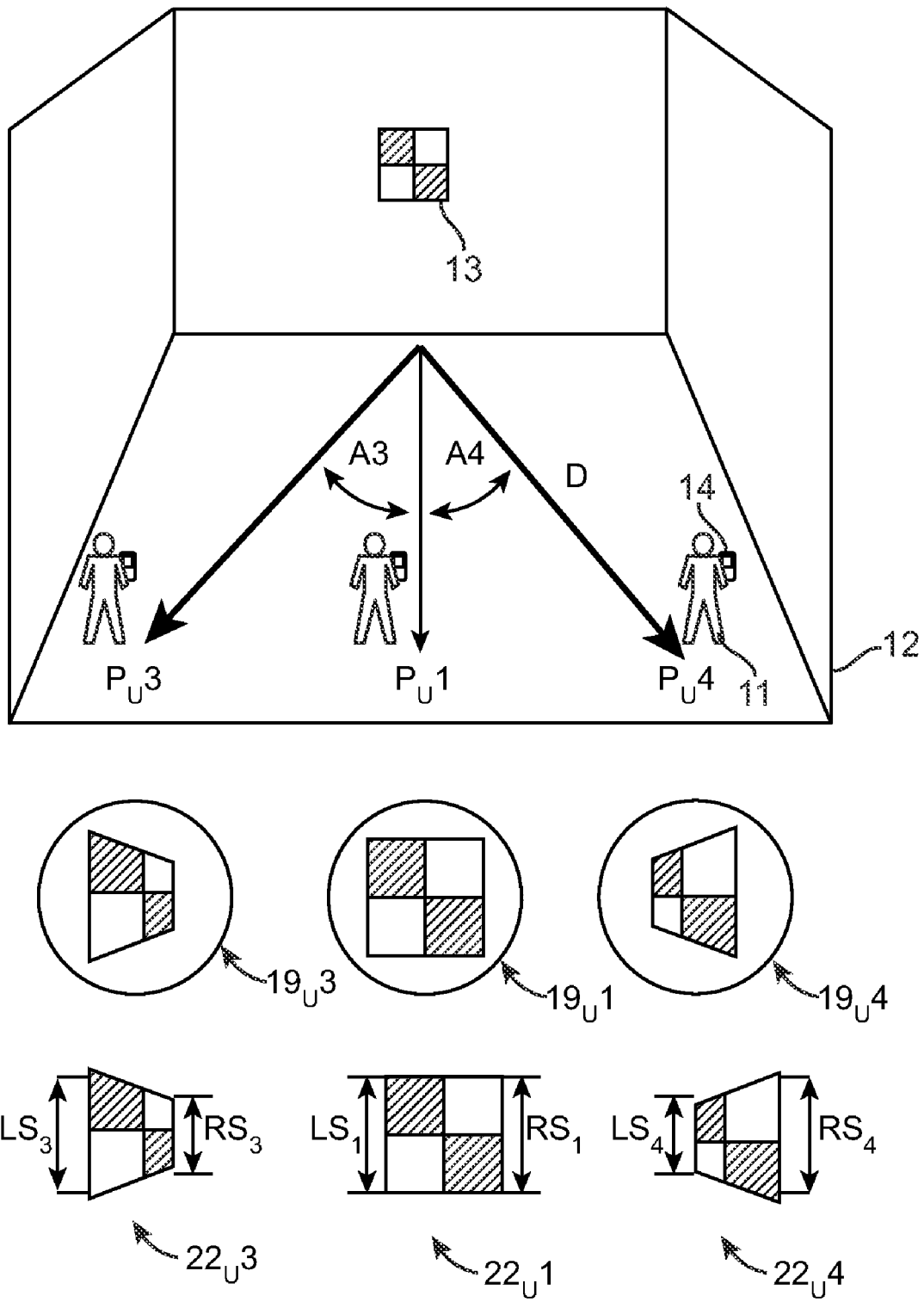

The deformation of tag image envelope 22 in the captured image 19 of the tag 13 varies (deforms differently), at different camera positions, as shown by example in FIG. 6. Image $19_U 1$ with tag envelope $22_U 1$ is captured from position $P_U 1$, image $19_U 3$ with tag envelope $22_U 3$ is captured from position $P_U 3$, and image $19_U 4$ with tag envelope $22_U 4$ is captured from position $P_U 4$. As such, there is a link between lateral position of the camera 14 relative to the tag 13 and the deformation of the tag image 22 in the image 19.

As noted, the angular position of the camera, in relation to the tag 13, is determined by evaluating deformation of the tag in the extracted image envelope 22. The viewer line of site is at the level of the tag image 22, such that the only horizontal deformation is due to lateral position (left $P_U 3$, right $P_U 4$) of the camera 14 relative to the tag 13, and vertical lines of the tag remain vertical in the image 22.

Depending on the lateral position ($P_U 3, P_U 4$) of the user (camera) relative to the tag 13, the image of the tag ($22_U 3$ and $22_U 4$) is deformed relative to a tag image ($22_U 1$) for a center position ($P_U 1$) of the user. As shown in FIG. 6, the right side vertical size RS and the left side vertical size LS of the image 22 varies depending on the lateral position of the user (camera):

In position $P_U 1$ : $RS_1 = LS_1$,

In position $P_U 4$ : $RS_4 > LS_4$,

In position $P_U 3$ : $RS_3 < LS_4$.

As noted, the image 22 is analyzed for deformation of known geometrical characteristics of the tag due to perspective (e.g., viewing angle, geometries dimensions and sizes) and optical characteristics of the camera at the time of capturing the tag picture (e.g., focal length of lens, size of sensor). In this example, the image $22_U 1$ at position represents known characteristics of the tag 13 (i.e., $RS_1 = LS_1$). The values LS and RS can be in pixels, centimeters, etc. The more the user moves horizontally to the right of center position $P_U 1$, the larger RS becomes relative to LS.

Figure 7:
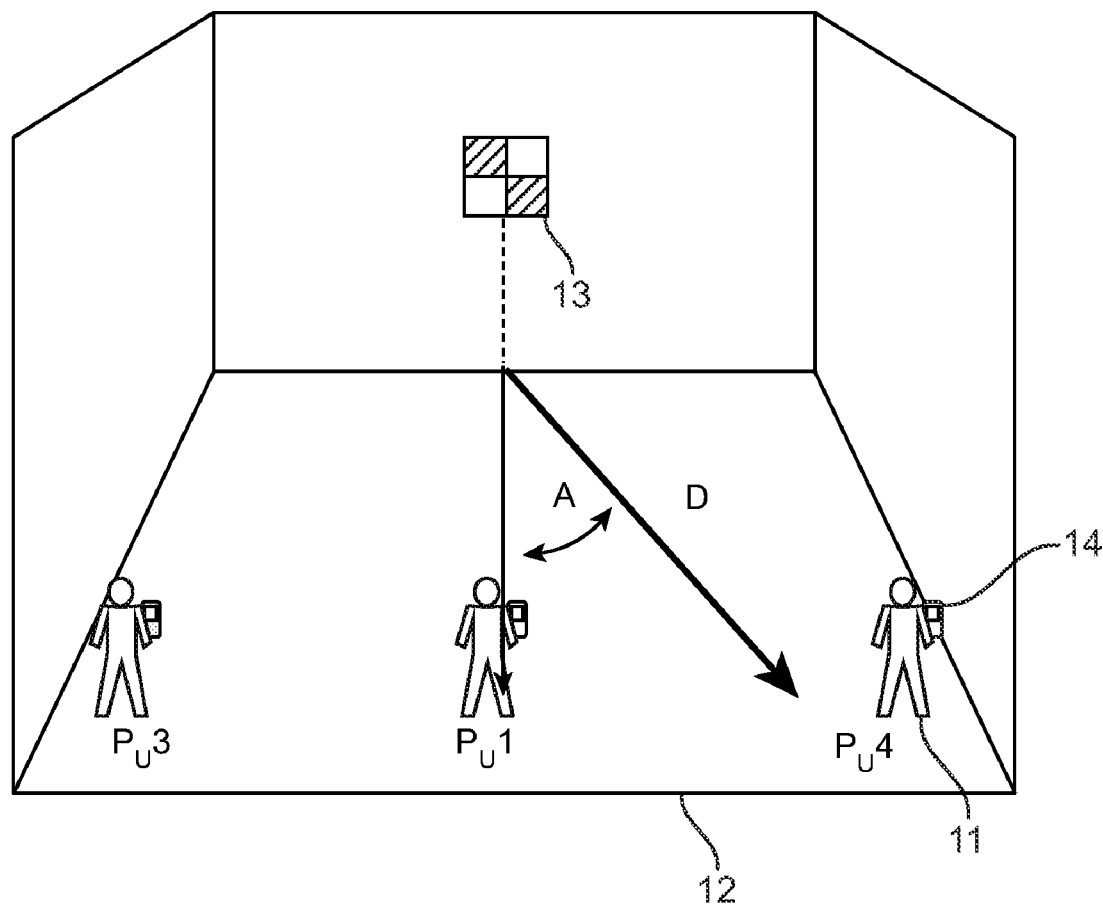

The more the user moves horizontally to the left of center position $P_U 1$, the smaller RS becomes relative LS. Referring now also to FIG. 7, in conjunction with FIG. 6, if a is denoted as the angle between a $P_U X$ and $P_U 1$ (as shown in FIG. 6), wherein X is a position index, then variations in angle a (e.g., a3, a4) are a function of variations in RS and LS. The value of a can be determined as a function g( ) of geometrical characteristics of the picture Tag deformation a=g (tag picture geometry).

Figure 8:
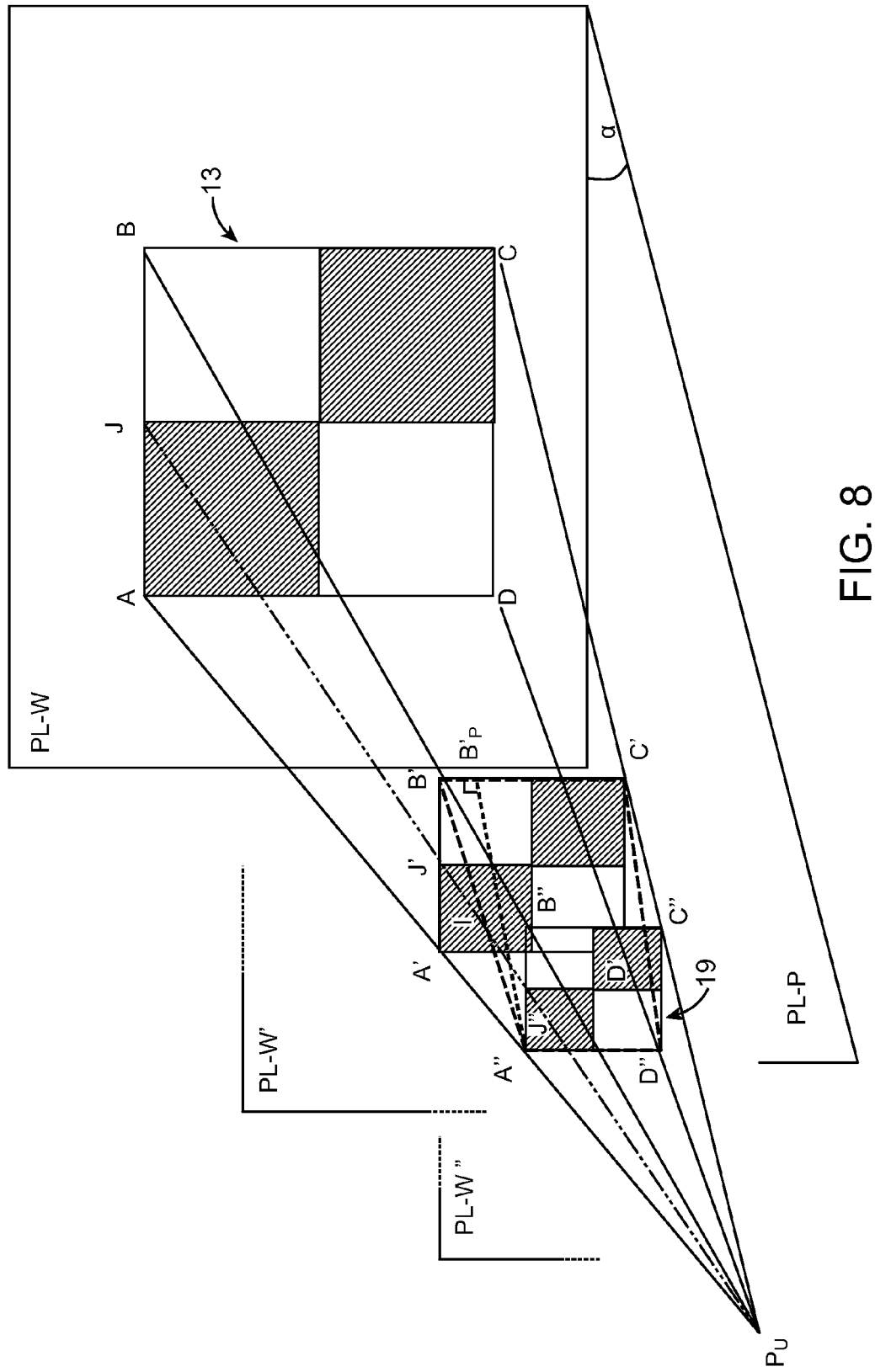
FIGS. 8-10 shows example deformation calculation processes, according to an embodiment of the invention.

As shown by example FIG. 8, perspective projection concepts are utilized wherein the tag 13 is a square ABCD that has each side with a length l, and is placed on a wall corresponding to the plane PL-W. The process takes into account a deformation of the image due to lateral movement, wherein vertical lines remain vertical (for simplifying the process). The image seen on the screen corresponds to a conic projection that uses as a center of projection, the eye of the user ($P_U$) and a plane PL-P that is orthogonal to the axis joining the eye of the user and the center of the ABCD tag. The angle between PL-P plane and PL-W plane is named α. The PL-P plane intersects the lines joining the eye of the User ($P_U$) and the four vertices A,B,C,D of the tag in points that are A", B", C", D", representing the image 19 taken by the camera as seen by the user. The plane PL-W' is a plane that is parallel to plane PL-W, and contains A' and B'. It intersects $P_UA$, $P_UB$, $P_UC$, $P_UD$ in A', B', C', D'. The plane PL-W" is a plane that is parallel to plane PL-W, and contains A" and B". It intersects $P_UA$, $P_UB$, $P_UC$, $P_UD$ in A", B", C", D". Then l, l', l" are respectively the length of each sides of ABCD, A' B' C' D', A" B" C" D" squares. Further, J, J' and J" are respectively the middle of AB, A'B' and A"B" due to the parallelism of the three planes PL-W, PL-W' and PL-W" and simple Thales Theorem. Further, PL-O plane is a plane that is orthogonal to PL-W, PL-W', PL-W" and that is containing A", and the PL-O plane intersects B'C' in a B' point that is the orthogonal projection of B' on it.

Figure 9:
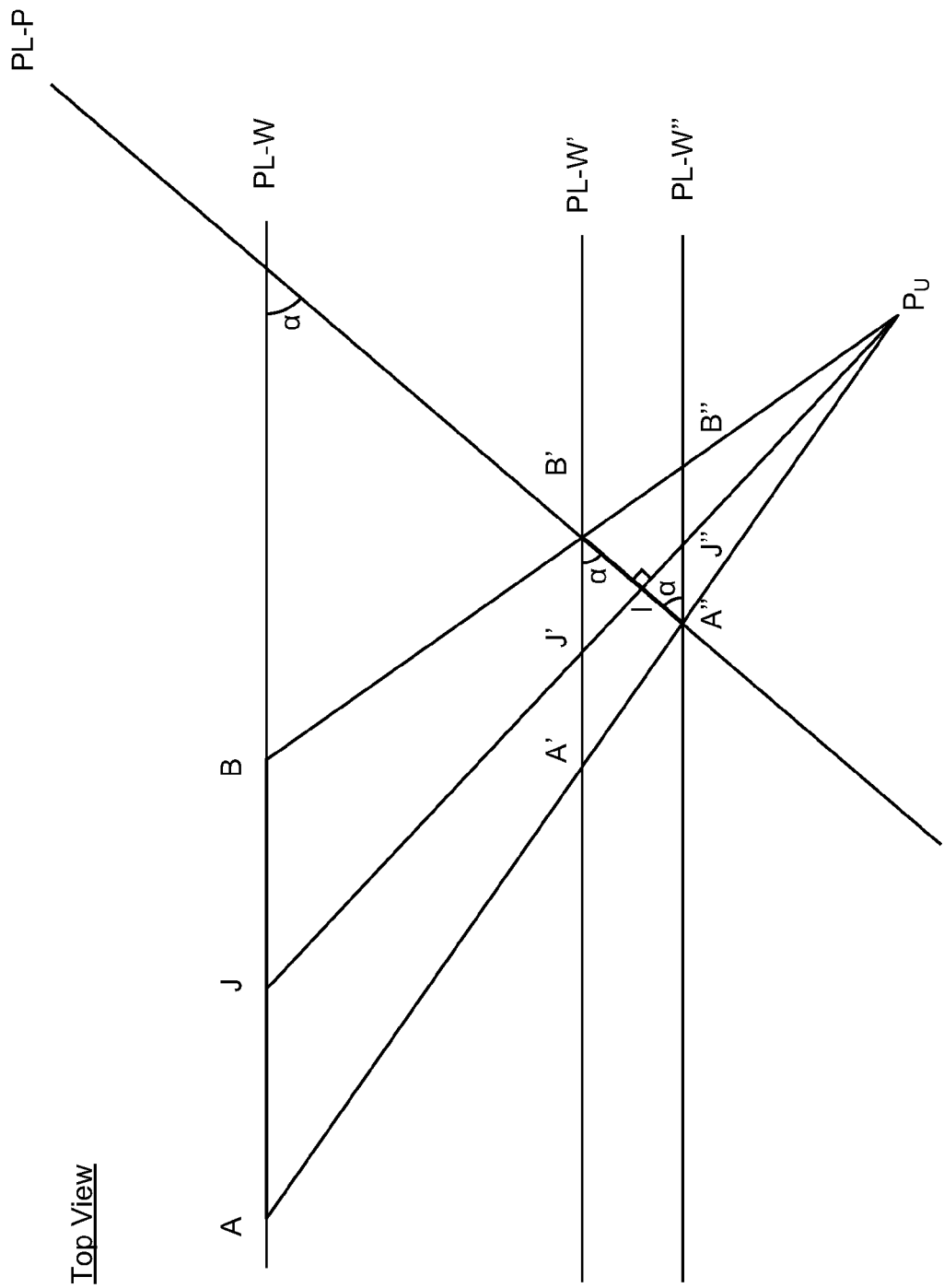

FIG. 9 represents an example of an orthogonal projection of points to PL-0 plan (where for an easier notation, the projected points have the same name as real points in a 3D space). As PL-W, PL-W' and PL-W" are parallel and PL-P has the same angle with all said planes, then B'J'I and J"A"I form two triangles which are right triangles because of PL-P is orthogonal to $P_U$ J line by definition (where J on this view represents its projection on the PL-0 plane), and the same angle a applies to B' and A". As such, for said two triangles: cos α=IB'/J'B' and cos α=IA"/J"A".

Therefore, IB'=cos α*J'B' and IA"=cos α*J"A" (wherein "*" represents multiplication). A"B'=A"I+IB'=cos α(J'B'+ J"A"), and J'B'=l'/2 and J"A"=l"/2. As such, A"B'=cos α*(l'+ l")/2. As the projections in FIG. 9 show, B' is in fact the B'$_p$ in FIG. 8, wherein:

$$A"B'p = \cos α*(l'+l")/2 \quad (1)$$

Figure 10:
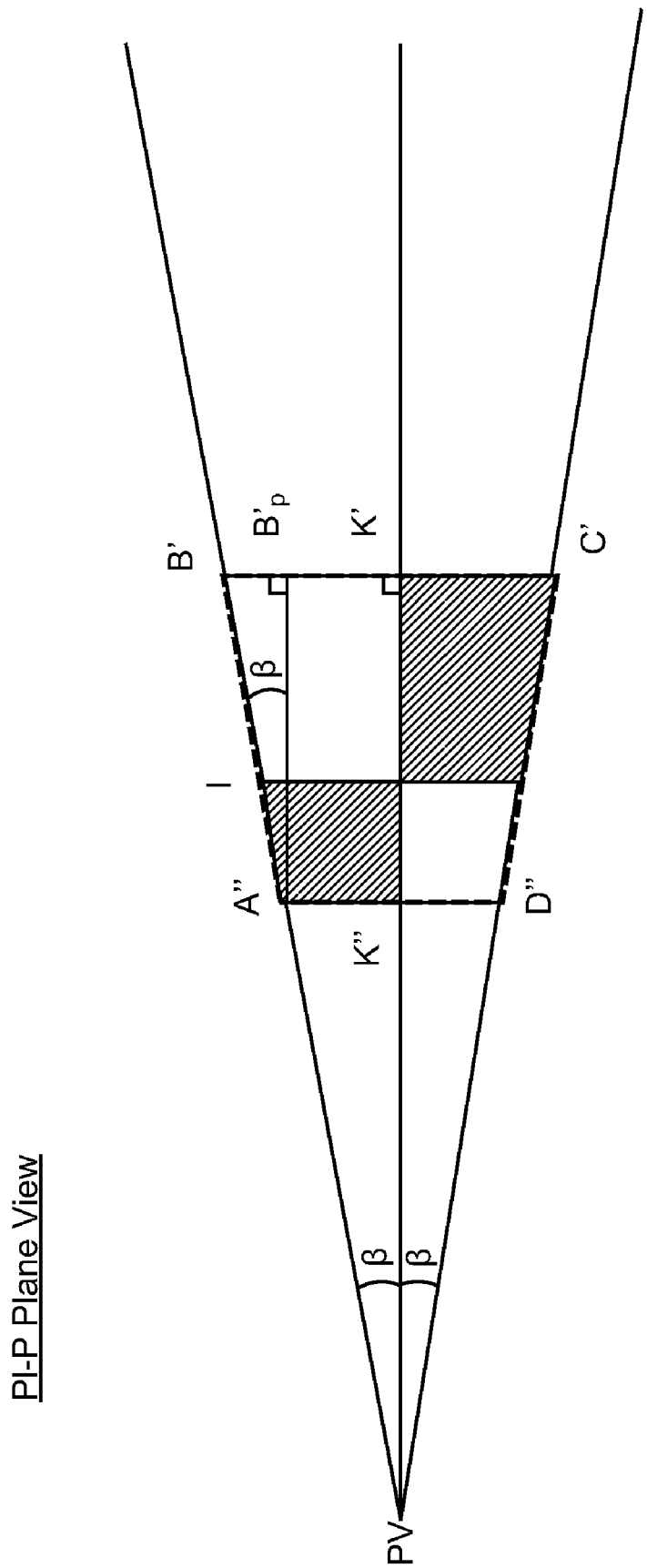

FIG. 10 shows the lines containing A"B' and D"C' intersecting in a point PV (vanishing point in projective perspective domain). Because of the configuration of the scene, K' and K" are respectively the middle of A"D" and B'C', and β is the angle between PVA" and PVK". As such, A"B'$_p$ is orthogonal to B'C' by definition of B'$_p$, and A"B'$_p$ is parallel to K"K' line. Thus we have the same β angle on A" in the A"B'B'$_p$ triangle, wherein cos β=A"B'$_p$/A"B'. As such:

$$A"B'p = \cos β*A"B' \quad (2)$$

By combining relations (1) and (2) above, the function g( ) that links the a angle and the characteristics measured on the image 19 of the tag 13 can be represented as:

$$A"B'_p = \cos α*(l'+l")/2 = \cos β*A"B'$$

wherein $$\cos α = (2*\cos β*A"B')/(l+l')$$

such that $$α = \text{Arc } \cos[(2*\cos β*A"B')/(l+l')] = g(l,l',A"B, β) \quad (3)$$

A simple trigonometric relation links the a angle calculated above and the angle a shown in FIGS. 6 and 7, wherein a is the angle between the user direction and the orthogonal line to PL-W, and α is the angle between the user direction PL-W.

Thus a+α+90 =180 degrees (i.e., relation between threes angles of a right angle triangle), wherein: α=−a−90.

A similar process can be used to determine the vertical deformation of the image 22 due to vertical position of the camera relative to the tag 13. The vertical deformation can be combined with the horizontal to obtain an overall measure of deformation. For example, Vertical deformation angle $A_V$ may be calculated using a $g_V(\ )$ function, similar to the function g( ) above, but using TS (Top size of the deformed Visual Tag) and BS (Bottom size of deformed the visual Tag), where $a_V = g_V(\text{TS, BS})$.

The position of the user relative to the tag ($RP_U$) can be determined based on said distance D and the angular position A as a function h( ) of D and A:

$$RP_U = h(D, A).$$

For example, if R2 is a reference Cartesian Coordinate System, then x and z axes form a plane corresponding to the surface of the visual tag, and the y-axis perpendicular to the plane formed by x and z axes. $RP_U(x_{U2}, y_{U2}, z_{U2})$ represents coordinates in R2. An angle A is the angle between the y axis and the projection of line that joins the origin O of R2 and the user position, is on a plane formed by the x and y axes. As such:

$$x_{U2} = d*\cos(a),$$

$$y_{U2} = d*\sin(a).$$

A similar formula using A' angle between the z axis and the projection of line that is joining the origin O of R2 the user position on the x and z plane, results in: $z_{U2}=d*\cos(a')$, wherein d is shown in FIG. 7.

The absolute position $AP_U$ of the user, in the area 12, can be determined as a function i( ) of the relative position $RP_U$ and the tag position $P_{VT}$ (in a x, y, z Cartesian reference) such that:

$$AP_U = i(RP_U, P_{VT}),$$

wherein $AP_U$ represents the geographical position of the user. For example, if R1 is a reference Cartesian Coordinate System, $AP_U(x_{U1}, y_{U1}, z_{U1})$ represents user coordinates in R1, $P_{VT}(x_{VT1}, y_{VT1}, Z_{VT1})$ represents the Visual Tag coordinates in R1, R2 represents a new Cartesian Coordinates System that is a translation of R1 that uses $P_{VT}$ as origin, and $RP_U(x_{U2}, y_{U2}, z_{U2})$ represents user coordinates in R2 coordinates systems, then $AP_U$ can be determined as:

$$x_{U1} = x_{U2} \cdot x_{VT1}$$

$$y_{U1} = y_{U2} \cdot y_{VT1}$$

$$z_{U1} = z_{U2} \cdot z_{VT1}$$

The above process is also useful with multiple tags. The number of tags to be used in a place is closely linked to different constraints and parameters as: the geometry of the room, the optical characteristics of the image capture device, the constraints on the Tag Picture format for extracting the ID, the constraints of an external process using the position information calculated above, etc. A basic example for the user is to point the image capturing device to a unique tag, use the closest tag, and zoom if needed to obtain at least the size needed for the programs to extract the ID and the envelope of the Tag.

One or more components of the position detection module 15 may be implemented in the image capturing device 14, or may be stand alone modules in a computing environment (e.g., a network) which receives images from the capturing device, via a communication link (e.g., wired, wireless), and processes them to determine user position. The image capturing device may be implemented in a mobile device such as a smart phone, video camera, etc.

As is known to those skilled in the art, the aforementioned example architectures described above, according to the invention, can be implemented in many ways, such as program instructions for execution by a processor, as software modules, microcode, as computer program product on computer readable media, as logic circuits, as application specific integrated circuits, as firmware, etc. Further, embodiments of the invention can take the form of an entirely hardware embodiment, an entirely software embodiment or an embodiment containing both hardware and software elements. Though the invention has been described with reference to certain versions thereof; however, other versions are possible. Therefore, the spirit and scope of the appended claims should not be limited to the description of the preferred versions contained herein.

The terms "computer program medium," "computer usable medium," "computer readable medium", and "computer program product"," are used to generally refer to media such as main memory, secondary memory, removable storage drive, a hard disk installed in hard disk drive, and signals. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Furthermore, the computer readable medium may comprise computer readable information in a transitory state medium, such as a network link and/or a network interface, including a wired network or a wireless network, that allows a computer to read such computer readable information. Computer programs (also called computer control logic) are stored in main memory and/or secondary memory. Computer programs may also be received via a communications interface. Such computer programs, when executed, enable the computer system to perform the features of the invention as discussed herein. In particular, the computer programs, when executed, enable the processor multi-core processor to perform the features of the computer system. Accordingly, such computer programs represent controllers of the computer system.

Those skilled in the art will appreciate that various adaptations and modifications of the just-described preferred embodiments can be configured without departing from the scope and spirit of the invention. Therefore, it is to be understood that, within the scope of the appended claims, the invention may be practiced other than as specifically described herein.

What is claimed is:

1. A method of position determination, comprising:
   storing an actual tag in a reference data module;
   receiving an image of a visual tag, the image captured by an image-capturing device;
   comparing properties of the visual tag with properties of the actual tag; and
   based on the comparison, determining a position of the image-capturing device relative to the visual tag based on an angular position of the image capturing device relative to the visual tag,
   wherein the tag further has predefined geometrical characteristics associated therewith, such that determining the angular position further includes analyzing the image for deformation of said predefined geometrical characteristics of the visual tag due to angular position and optical characteristics of the image-capturing device at the time of capturing the image of the visual tag.

2. The method of claim 1, wherein determining the position of the image capturing device is further based on:
   a distance between the image-capturing device and the visual tag.

3. The method of claim 2, further comprising:
   determining a distance of the image-capturing device from the visual tag is further based on size of the image, size of the tag in the image and optical characteristics of the image-capturing device at the time the image was captured.

4. The method of claim 1, wherein the angular position of the image-capturing device relative to the visual tag is based on deformation of the tag in the image.

5. The method of claim 1, wherein the visual tag further includes identification information, the method further including determining identification of the tag from the image, and retrieving said predefined position and geometrical characteristics of the tag based on the identification.

6. The method of claim 5, further including providing a plurality of visual tags in an area, each tag having a predefined position and geometrical characteristics.

7. A computer program product for position determination, comprising a non-transitory computer usable medium including a computer readable program including program instructions, wherein the computer readable program when executed on a computer system causes the computer system to:
   store an actual tag in a reference data module;
   receive an image of a visual tag, the image captured by an image-capturing device;
   compare properties of the visual tag with properties of the actual tag; and
   based on the comparison, determine a position of the image capturing device relative to the visual tag based on an angular position of the image-capturing device relative to the visual tag,
   wherein the tag further has predefined geometrical characteristics associated therewith, such that determining said angular position further includes analyzing the image for deformation of said predefined geometrical characteristics of the visual tag due to angular position and optical characteristics of the image-capturing device at the time of capturing the image of the visual tag.

8. The computer program product of claim 7, wherein the position of the image-capturing device is determined further based on:
   a distance between the image-capturing device and the visual tag.

9. The computer program product of claim 8 further including instructions for:
   determining a distance of the image-capturing device from the visual tag based on size of the image, size of the tag in the image and optical characteristics of the image-capturing device at the time the image was captured.

10. The computer program product of claim 7, wherein the angular position of the image-capturing device relative to the visual tag is based on deformation of the tag in the image.

11. The computer program product of claim 10, wherein the tag in the image further has a predefined geometrical characteristics, and a deformation processing module determines said angular position by analyzing the image for deformation of said predefined geometrical characteristics of the visual tag, due to angular position and optical characteristics of the image-capturing device, at the time of capturing the image of the visual tag.

12. The computer program product of claim 11, wherein the visual tag further includes identification information, and a information processing module includes an image-processing module that determines identification of the tag from the image, and a tag position module retrieves said predefined position and geometrical characteristics of the tag based on the identification.

13. The computer program product of claim 12, wherein the image processing module determines an image envelope for the tag in the image.

14. A system for position determination, comprising:
 a plurality of visual tags for placement in one or more areas, each visual tag having a predefined position associated therewith;
 a reference data module that stores a plurality of actual tags;
 an image-capturing device configured for capturing an image of the plurality of visual tags;
 a deformation processing module that compares properties of a visual tag with properties of an actual tag; and
 a position detection module that determines a position of the image capturing device relative to the visual tag based on the comparison based on an angular position of the image-capturing device relative to the visual tag, wherein the tag further has predefined geometrical characteristics associated therewith, such that determining said angular position further includes analyzing the image for deformation of said predefined geometrical characteristics of the visual tag due to angular position and optical characteristics of the image-capturing device at the time of capturing the image of the visual tag.

15. The system of claim 14, wherein the deformation processing module determines the position of the image capturing device further based on:
 a distance between the image capturing device and the visual tag.

16. The system of claim 15, further comprising:
 an information processing module that determines a distance of the images-capturing device from the visual tag based on size of the image, size of a tag in the image and optical characteristics of the image-capturing device at the time the image was captured.

17. The system of claim 16, wherein the position detection module is implemented in one of the image-capturing device or one or more stand alone modules in the system that receives images from the image-capturing device via a communication link.

18. The system of claim 15, wherein the angular position of the image-capturing device relative to the visual tag is based on deformation of the tag in the image.

* * * * *